US009103154B2

(12) United States Patent
Sitzler et al.

(10) Patent No.: US 9,103,154 B2
(45) Date of Patent: Aug. 11, 2015

(54) DRIVE ARRANGEMENT FOR ACTUATION OF A HATCH OF A MOTOR VEHICLE

(75) Inventors: Rolf Sitzler, Erlangen (DE); Uwe Sommer, Effelder (DE); Gaetan Cordier, Wuppertal (DE); Denis Barral, Montalieu Vercieu (FR); Philippe Coudron, Caluire et Cuire (FR)

(73) Assignees: BROSE FAHRZEUGTEILE GMBH & CO. KG, HALLSTADT, Hallstadt (DE); COMPAGNIE PLASTIC OMNIUM, Lyons (FR)

( * ) Notice: Subject to any disclaimer, the term of this patent is extended or adjusted under 35 U.S.C. 154(b) by 609 days.

(21) Appl. No.: 13/202,969

(22) PCT Filed: Feb. 25, 2010

(86) PCT No.: PCT/EP2010/001166

§ 371 (c)(1),
(2), (4) Date: Dec. 8, 2011

(87) PCT Pub. No.: WO2010/097216

PCT Pub. Date: Sep. 2, 2010

(65) Prior Publication Data

US 2012/0066977 A1 Mar. 22, 2012

(30) Foreign Application Priority Data

Feb. 25, 2009 (DE) ..................... 20 2009 002 622 U
Jul. 21, 2009 (DE) ......................... 10 2009 034 287

(51) Int. Cl.
*B62D 25/06* (2006.01)
*E05F 15/622* (2015.01)
*E05F 15/619* (2015.01)

(52) U.S. Cl.
CPC ............. *E05F 15/622* (2015.01); *E05F 15/619* (2013.01); *E05Y 2201/434* (2013.01); *E05Y 2201/626* (2013.01); *E05Y 2600/46* (2013.01); *E05Y 2900/546* (2013.01)

(58) Field of Classification Search
CPC ......... B60J 5/106; E05F 11/54; E05F 15/622; E05F 15/619; E05Y 2201/434; E05Y 2600/46
USPC ............ 296/146.1, 146.4, 146.8, 155, 56, 55; 49/358; 74/89.23
See application file for complete search history.

(56) References Cited

U.S. PATENT DOCUMENTS 4,337,596 A * 7/1982 Kern et al. ...................... 49/210
4,406,420 A * 9/1983 Villano ...................... 242/388.6

(Continued)

FOREIGN PATENT DOCUMENTS

DE 3337642 A * 4/1985
DE 10253268 5/2004

(Continued)

OTHER PUBLICATIONS

International Search Report and Written Opinion for PCT/EP2010/01166, mailed Nov. 11, 2010, corresponding to U.S. Appl. No. 13/202,969, 14 pages.

*Primary Examiner* — Pinel Romain
(74) *Attorney, Agent, or Firm* — Pauly, DeVries Smith & Deffner, LLC

(57) ABSTRACT

A drive arrangement for actuation of a hatch of a motor vehicle with a drive is provided, wherein the hatch is pivotable via hinges around a geometrical hatch axis, whereby a hatch opening of the motor vehicle body may be closed, wherein the drive is designed as an elongate linear drive for producing linear drive movements, wherein in the installed state the drive extends along the hatch axis and is aligned basically parallel to the hatch axis in view of its linear drive movements. In the installed state, the drive is positioned in cavity of the hatch in the area of the hatch axis, a redirection gear is provided which is arranged in the area of the hatch axis, and the drive is drive-wise coupled to the motor vehicle body via the redirection gear through openings in the hatch.

16 Claims, 7 Drawing Sheets

(56) References Cited

U.S. PATENT DOCUMENTS

| | | | | |
|---|---|---|---|---|
| 4,612,729 | A * | 9/1986 | Sato | 49/362 |
| 6,814,392 | B1 * | 11/2004 | Tomaszewski | 296/146.4 |
| 6,974,180 | B2 * | 12/2005 | Eipper et al. | 296/210 |
| 7,127,791 | B2 * | 10/2006 | Barringer et al. | 29/456 |
| 7,448,669 | B2 * | 11/2008 | Legon | 296/146.4 |
| 7,866,729 | B2 * | 1/2011 | Porat et al. | 296/146.4 |
| 8,863,356 | B2 * | 10/2014 | Bacchetti | 16/54 |
| 2005/0235564 | A1 * | 10/2005 | Fronz et al. | 49/209 |
| 2009/0007491 | A1 * | 1/2009 | Jarolim | 49/210 |
| 2009/0113803 | A1 * | 5/2009 | Arenz | 49/358 |
| 2012/0013143 | A1 * | 1/2012 | Schiegel | 296/146.4 |

FOREIGN PATENT DOCUMENTS

| | | |
|---|---|---|
| DE | 102004056153 | 6/2006 |
| DE | 202005003466 | 8/2006 |
| DE | 202005007154 | 10/2006 |
| DE | 202005018584 | 4/2007 |
| DE | 202005018584 U1 | 4/2007 |
| DE | 102007003601 | 7/2007 |
| DE | 102007059995 | 2/2009 |
| EP | 1419916 | 5/2004 |
| FR | 2796097 | 1/2001 |

* cited by examiner

DRIVE ARRANGEMENT FOR ACTUATION OF A HATCH OF A MOTOR VEHICLE

CROSS-REFERENCE TO RELATED APPLICATIONS

This application is a national stage application under 35 U.S.C. 371 of International Patent Application Serial No. PCT/EP2010/001166, entitled "DRIVE ARRANGEMENT FOR ACTUATION OF A HATCH OF A MOTOR VEHICLE," filed Feb. 25, 2010, which claims priority from German Patent Application Nos. 20 2009 002 622.1 filed Feb. 25, 2009 and 10 2009 034 287.7 filed Jul. 21, 2009, the disclosures of which are incorporated herein by reference.

FIELD OF THE INVENTION

The present invention relates to a drive arrangement for actuation of a hatch, in particular the tailgate, of a motor vehicle, to a hatch arrangement of a motor vehicle having a drive arrangement, and to a spoiler arrangement.

BACKGROUND

In the present text, the expression "hatch" of a motor vehicle is to be understood comprehensively. Accordingly, it includes not only the tailgate, the rear boot lid or the engine hood, but also the side door of a motor vehicle.

The hatch being discussed is pivotable by means of hinges about a geometrical hatch axis, whereby a hatch opening of the motor vehicle body may be closed. In this context, it may be noted that the motor vehicle body does not include the hatch in the present illustration. The hatch of the motor vehicle is therefore not a constituent part of the motor vehicle body.

The known drive arrangement (DE 20 2005 018 584 U1), from which the invention proceeds, is equipped with an elongate spindle drive for producing linear drive movements. In the installed state, the spindle drive extends along the hatch axis and is aligned substantially parallel to the hatch axis with regard to its linear drive movements. Here, the spindle drive is arranged in the region of the rear roof frame in the vicinity of the hatch axis. A satisfactory utilization of the installation space is therefore ensured.

The known drive arrangement has disadvantages with regard to its crash behaviour. As a result of the fact that the drive is regularly separated from the vehicle interior only by a cover which is not very robust mechanically, the drive can lead to a risk to the vehicle occupants in the case of crash-induced deformations in the roof region. This is true, in particular, for motor vehicles, in which an additional rear row of seats is provided.

SUMMARY OF THE INVENTION

The invention is based on the problem of designing and developing the known drive arrangement in such a way that the crash safety is increased.

The present invention is directed, in part, to a drive arrangement for actuation of a hatch of a motor vehicle with a drive, wherein the hatch is pivotable, and in particular via hinges, around a geometrical hatch axis, whereby a hatch opening of the motor vehicle body may be closed, wherein the drive is designed as an elongate linear drive for producing linear drive movements, wherein in the installed state the drive extends along the hatch axis and is aligned basically parallel to the hatch axis in view of its linear drive movements, wherein in the installed state the drive is positioned in a cavity of the hatch in the area of the hatch axis, that a redirection gear is arranged in the area of the hatch axis and that the drive is drive-wise coupled to the motor vehicle body via the redirection gear through openings in the hatch.

According to the invention, it has been discovered that the required crash safety can be realized readily if the drive is situated in a cavity of the hatch. In the simplest case, a wall of the hatch can be used to separate the drive from the vehicle interior, as will be explained below.

The basic concept of the arrangement of the drive in the cavity of the hatch becomes practicable by the fact that the drive is positioned in the area of the hatch axis. In addition, the entire drive extends along the hatch axis, with the result that the torque which acts on the hatch as a result of the weight of the drive is low overall. As a result, the drive can be designed to be comparatively weak and therefore inexpensive.

The arrangement of the drive in a cavity of the hatch is also associated with an advantageous development of noise in the vehicle interior. In the case of a corresponding design, it is possible to largely decouple the vehicle interior from the drive in noise terms. This effect is assisted by the arrangement of the drive in the area of the hatch axis. On account of the high mechanical rigidity which prevails there, only low resonance oscillations are to be expected in the frequency range of interest here.

The behaviour of the arrangement according to the proposal with regard to EMC (electromagnetic compatibility) is also particularly advantageous as a result of the arrangement of the drive in a cavity of the hatch. In the case of a suitable design of the hatch, the latter can serve as a shield of the drive against electromagnetic radiation which is produced by the drive.

For the drive-wise coupling of the drive to the motor vehicle body, the drive arrangement is finally equipped with a redirection gear which protrudes through corresponding openings in the hatch.

In one embodiment, the drive is a spindle drive. With regard to the principal structural design of the spindle drive, reference is made to German Utility Model 20 2005 007 154 U1 which is attributed to one of the two applicants and which to this extent is made the subject matter of the present application, and incorporated herein by reference in its entirety.

The particular advantage of the above use of a spindle drive is attributed to its particularly slim design. It is thus possible to position the spindle drive as closely as possible to the hatch axis, with the result that the influence of the weight of the spindle drive moves further into the background.

According to a further teaching which likewise is given independent significance, a hatch arrangement of a motor vehicle with a hatch as above and a drive arrangement for actuation of the hatch is provided.

The fact is that the hatch is equipped with the abovementioned cavity which receives the drive is essential in the hatch arrangement according to the proposal. It has been explained further above that this can increase the crash safety in a particularly simple way.

According to one embodiment, the drive arrangement is the above drive arrangement according to the proposal. In this context, reference may be made to all comments with respect to the drive arrangement according to the proposal.

In the preferred embodiment, the hatch is equipped with a hatch inner skin and a hatch outer skin. In the present case, the expressions "hatch inner skin" and "hatch outer skin" are to be construed widely. It is essential that the hatch inner skin and the hatch outer skin are connected to one another in order to form the hatch inner side and the hatch outer side. Here, both the hatch inner skin and the hatch outer skin can be configured in multiple pieces and comprise spoiler components, covers, lights, connections and/or ventilation slits.

In the particularly preferred embodiment according to claim 26, the drive is separated from the vehicle interior by the hatch inner skin. This increases the abovementioned crash safety inexpensively, since the hatch inner skin is provided in any case.

In the further preferred embodiment, one part of the hatch outer or inner skin forms a cover for the cavity, in which the drive is arranged. The simple accessibility of the drive is ensured by way of the realization of a cover for the cavity which receives the drive.

The fact that the drive according to the proposal can be additionally assigned an adjustable spoiler component is interesting in a further preferred embodiment. The adjustability of spoiler components is provided, in particular, in order to increase the downforce on the drive axle of the motor vehicle at high speeds.

The drive is coupled correspondingly to the spoiler component for the motorized adjustment of the spoiler component. In a particularly preferred embodiment this drive-wise coupling is active only when the hatch is situated in the closed position and is otherwise inactive.

The above selective coupling is appropriate, since the respective hatch is regularly closed during driving operation. A selective coupling of this type can also be realized readily, for example by a deliberate freewheel between the drive and the hatch on one side and between the drive and the spoiler component on the other.

According to a further, independent teaching, a spoiler arrangement having a spoiler component is provided. Here, it is assumed first of all that the spoiler component is of elongate design and extends substantially over part of the width of the motor vehicle. The spoiler component can regularly be adjusted transversely with respect to its longitudinal extent by means of the drive between a retracted position and an extended position. Numerous variants are conceivable for the adjusting movements realized here.

It is essential then that the drive is configured as an elongate linear drive for producing linear movements, and that the drive extends along the spoiler component and is aligned basically parallel to the spoiler component in view of its linear drive movements. It has been discovered here that regularly a certain amount of installation space which can be used for receiving the drive is present along the spoiler component, either in the spoiler component itself or in the component which carries the spoiler component.

In a particularly preferred embodiment, in the installed state the drive is arranged at or in the spoiler component. The drive therefore follows the adjusting movement of the spoiler component precisely as in the hatch arrangement proposed further above.

In one embodiment, the drive arrangement includes a redirection gear having two redirection levers that each are pivotable around a redirection axis. Preferably, the redirection axes are aligned basically vertically when the hatch is situated in the closed position, and/or, the redirection axes are always to be aligned basically perpendicular to the hatch axis.

In another embodiment, the drive arrangement includes redirection levers drive-wise designed as two-arm levers which each comprise a drive lever which is assigned to the drive and a driven lever which is assigned to the motor vehicle body.

In another embodiment, the driver arrangement includes driven levers, each coupled to the motor vehicle body via a push rod. In another embodiment, the drive arrangement includes driven levers, each drive-wise coupled to the fixed part of the respective hinge in particular via a push rod. In another embodiment, the geometrical lever arm of the drive lever is larger than the geometrical lever arm of the driven lever of the respective redirection lever.

In another embodiment, the drive train part comprising the redirection lever, push rod and hinge forms a gear, which gear ratio changes during movement of the hatch from the closed position to the opened position whereby the gear ratio preferably runs through a maximum.

In another embodiment, the hinges, possibly via coupling elements, are fastened from the outside to a wall of the cavity which receives the drive and that carrier elements for the redirection levers are fastened from the inside of this wall so as to lie opposite one another in each case, or, the hinges and the carrier elements are in pairs designed as one single part. In another embodiment, the drive comprises a housing and a support for the drive perpendicular to its longitudinal extent is provided. Preferably, the hatch provides such support, or, the cavity which receives the drive is filled at least partly with a material that supports the drive.

In another embodiment, the drive is configured as a spindle drive. Preferably, the drive comprises within a housing subsequently arranged a drive motor with subsequent intermediate gear and a spindle/spindle nut gear subsequent to the intermediate gear.

In another embodiment, the spindle drive comprises two basically tubular housing parts which interact in a telescopic manner and that are form fitted and thereby are pivot locked to each other. In another embodiment, the overall length of the spindle drive in its extended position is a multiple of its maximum way of movement. Preferably, the overall length of the spindle drive in its extended position is about four times of its maximum way of movement. In another embodiment, the spindle drive is coupled to the redirection levers without additional transmission elements being connected in between.

In another embodiment, the drive comprises a control device for control of the drive movements and the control device is arranged in the cavity of the hatch which receives the drive and in particular in the area of the hatch axis. In another embodiment, the hatch is designed as a tailgate, a rear boot lid, an engine hood, a side door or the like of a motor vehicle.

In another embodiment, the redirection gear comprises one single redirection lever which is pivotable around a redirection axis. Preferably, the redirection axis is aligned basically vertically when the hatch is in the closed position, and/or, that the redirection axis is always basically aligned perpendicular to the hatch axis. Further preferably, the redirection lever is drive-wise designed as a two-arm lever and comprises a drive lever that is assigned to the drive and a driven lever that is assigned to the motor vehicle body. Further preferably, the driven lever is coupled to the motor vehicle body via a push rod.

In another embodiment, the redirection gear comprises a gear wheel, that is excentrically coupled to the drive on the one hand and that is excentrically coupled to the motor vehicle body on the other hand. Preferably, the coupling between the gear wheel and the drive and/or the coupling between the gear wheel and the motor vehicle body is in each case realized via a push rod.

In another embodiment, the redirection gear comprises a flexible force transmission means that is coupled to the drive on the one hand and that is coupled to the motor vehicle body on the other hand. Preferably, the flexible force transmission means is a push-pull bowden cable, a ball chain, a chain drive or the like.

In another embodiment, a hatch arrangement of a motor vehicle with a hatch that is pivotable in particular via hinges around a geometrical hatch axis is provided, whereby a hatch opening of the motor vehicle body may be closed, wherein a drive arrangement with a drive is provided for actuation of the hatch, wherein the drive is positioned in a cavity of the hatch in the area of the hatch axis. In another embodiment, the drive is designed as an elongate linear drive for producing linear drive movements and the drive extends along the hatch axis and is aligned basically parallel to hatch axis in view of its linear drive movements.

In one embodiment, the area of the hatch axis redirection gear is arranged and the drive is drive-wise coupled to the motor vehicle body via the redirection gear through openings in the hatch. In another embodiment, the cavity that receives the drive is designed as a dry area. In another embodiment, the hatch comprises a hatch inner skin and a hatch outer skin. Preferably, the hatch inner skin and/or the hatch outer skin is/are formed in multiple pieces.

In another embodiment, the cavity receiving the drive is formed by the hatch inner skin and the hatch outer skin. In another embodiment, the drive is separated from the vehicle interior by the hatch inner skin. In another embodiment, one part of the hatch outer or inner skin forms a cover for the cavity which receives the drive. Preferably, the cover is detachable such that the drive is accessible for maintenance work.

In another embodiment, the hatch inner skin includes at least partly of a plastic material, for example thermoplastic material or a thermosetting material. Preferably, the hatch inner skin at least in the area of the hatch axis comprises support structures and/or a carrier element.

In another embodiment, the redirection gear comprises one single redirection lever which is pivotable around a redirection axis. Preferably, the redirection axis is aligned basically vertically when the hatch is in the closed position, and/or, the redirection axis is always basically aligned perpendicular to the hatch axis. Further preferably, the redirection lever is drive-wise designed as a two-arm lever and comprises a drive lever that is assigned to the drive and a driven lever that is assigned to the motor vehicle body. Further preferably, the driven lever is coupled to the motor vehicle body via a push rod.

In another embodiment, a spoiler arrangement with an elongate spoiler component is provided, that is moveable between a retracted position and an extended position transversely with respect to its longitudinal extend, wherein a drive arrangement with a drive for actuating the spoiler component is provided, wherein the drive is designed as a elongate linear drive for producing linear drive movements and the drive extends along the spoiler component and is aligned basically parallel to the spoiler component in view of its linear drive movements.

In one embodiment, in the installed state the drive is positioned at or in the spoiler component. In one embodiment, a redirection gear is provided and the drive, depending on its installation position, is drive-wise coupled to the motor vehicle body or to a hatch of the motor vehicle carrying the spoiler component or with the spoiler component.

BRIEF DESCRIPTION OF THE FIGURES

In the following text, the invention will be explained in greater detail using a drawing which illustrates exemplary embodiments and in which.

DETAILED DESCRIPTION

Figure 1:
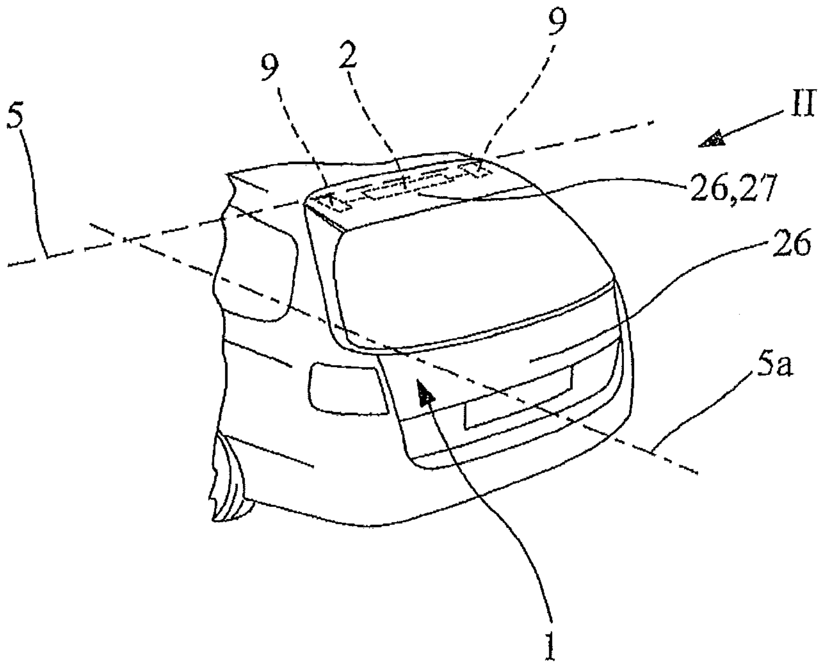
FIG. 1 shows the rear region of a motor vehicle with a hatch arrangement according to the proposal in a perspective illustration.

The motor vehicle shown in FIG. 1 is equipped with a drive arrangement for actuation of a hatch 1, here the tailgate 1 of the motor vehicle. The drive arrangement correspondingly has a drive 2. Here and preferably, the drive 2 is the only drive. However, it is also conceivable that a plurality of, in particular two, drives 2 are provided.

The actuation of the hatch 1 brought about by the drive arrangement is a motorized actuation, in which the hatch 1 is adjusted in a motorized manner between an open position and a closed position. The drive 2 can be, in particular, an electric, a hydraulic, a pneumatic drive 2 or the like.

In the exemplary embodiment which is shown and to this extent preferred, the hatch 1 is pivotable via hinges 3, 4 around a geometrical hatch axis 5, whereby a hatch opening of the motor vehicle body may be closed.

Figure 2:
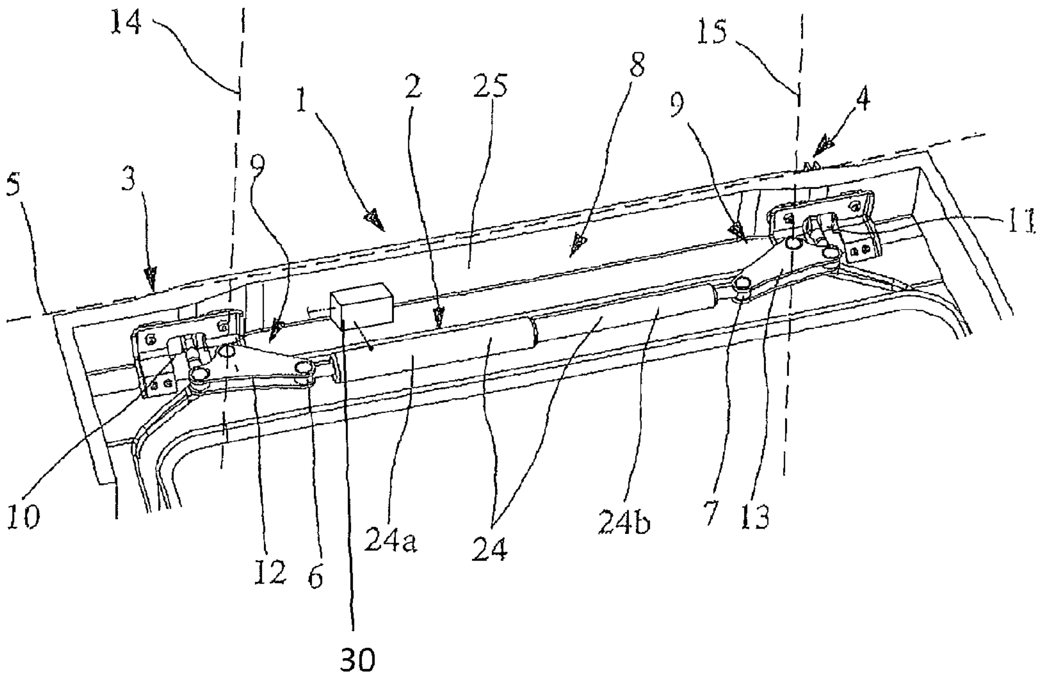
FIG. 2 shows the hatch according to FIG. 1 with a dismantled hatch outer skin according to view II.
Figure 3:
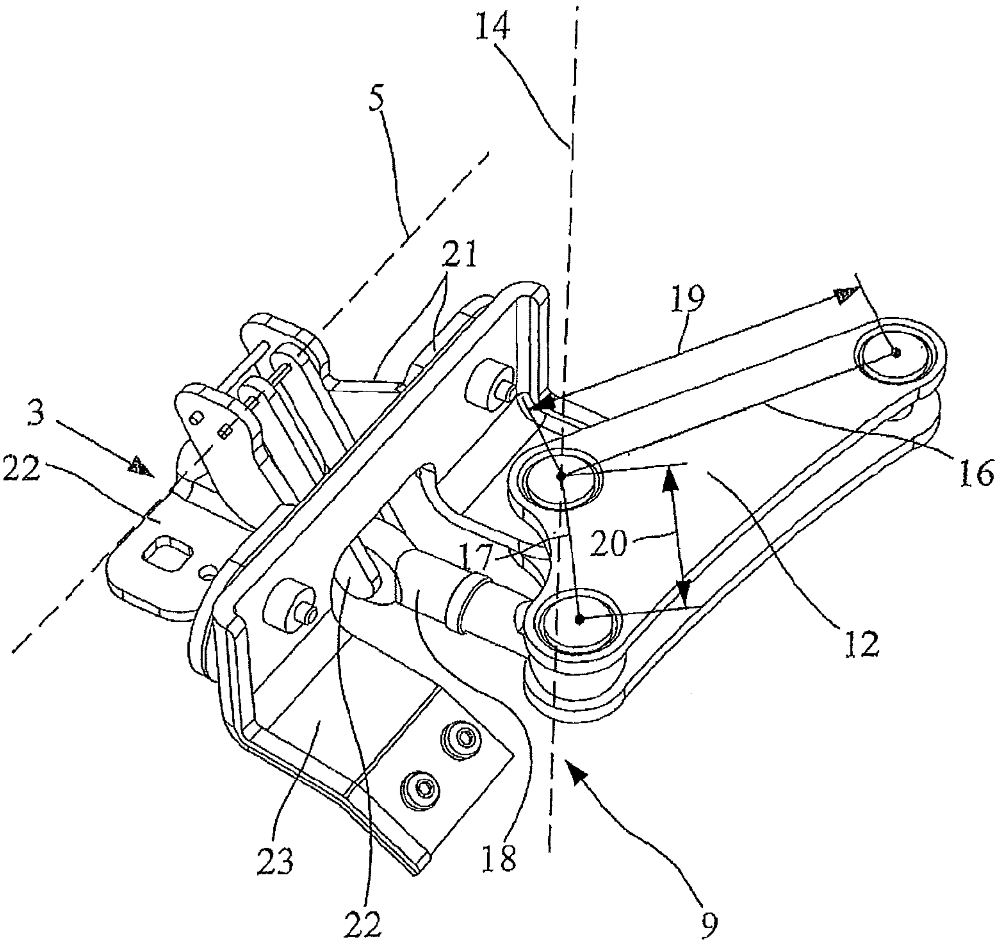
FIG. 3 shows a hinge with associated redirection lever and associated push rod of the arrangement according to FIG. 2 in the dismantled state, in a perspective view.

The left-hand hinge 3 illustrated in FIG. 2 is shown in detail in FIG. 3. It can be seen from this illustration that the geometrical hatch axis 5 is a stationary hatch axis, the position of which does not change during the adjustment of the hatch 1. However, it is conceivable that the hatch axis 5 carries out a parallel displacement during the adjustment of the hatch 1. This is the case, for example, if the hatch 1 is articulated on the motor vehicle body via a multiple joint kinematic system or via an outward-rotating hinge. FIG. 2 shows control device 30.

The drive 2 is designed here as an elongate linear drive for producing linear drive movements. For this purpose, the drive 2 has drive connections 6, 7, via which the drive movements are output.

In the installed state shown, the elongate linear drive 2 extends along the hatch axis 5. In addition, the linear drive 2 is aligned basically parallel to the hatch axis 5 in view of its linear drive movements. This is advantageous, since there is regularly installation space along the hatch axis 5 which can be used for accommodating the drive 2.

According to the proposal, in the installed state the drive 2 is positioned in a cavity 8 of the hatch 1 in the area of the hatch axis 5. The cavity 8 can be an installation space of any type within the hatch 1. In particular, the cavity 8 does not necessarily have to be sealed to the outside.

In order for it to be possible to pass the drive movements of the drive 2 to the motor vehicle body, a redirection gear 9 is provided which is arranged in the area of the hatch axis 5. Here, the drive 2 is drive-wise coupled to the motor vehicle body via the redirection gear 9 through openings 10, 11 in the hatch 1. The openings 10, 11 can be gathered from the illustration in FIG. 2.

Here, the redirection gear 9 is arranged on both sides of the drive 2 and is of mirror-symmetrical configuration in relation to the longitudinal axis 5*a* of the motor vehicle. FIG. 3 shows the left-hand (as viewed in the driving direction) section of the redirection gear 9.

FIG. 2 shows that the redirection gear 9 has two redirection levers 12, 13 which are each pivotable around a redirection axis 14, 15. If the hatch 1 is situated in the closed position, the redirection axes 14, 15 are aligned vertically here and preferably. FIG. 2 shows the closed position of the hatch 1.

As an alternative or in addition, there can be provision, as shown here, for the redirection axes 14, 15 always to be aligned basically perpendicular to the hatch axis 5. In most applications, the above alignment of the redirection axes 14, 15 leads to optimum utilization of installation space.

It can be gathered from the illustration in FIG. 3 that the redirection levers 12, 13 are drive-wise designed as two-arm levers which each comprise a drive lever 16 which is assigned to the drive 2 and a driven lever 17 which is assigned to the motor vehicle body. The levers 16, 17 are indicated in FIG. 3 in each case by a line.

It can be gathered from viewing FIGS. 2 and 3 together that the driven levers 17 each are coupled to the motor vehicle body via a push rod 18.

It is conceivable in practice that the driven levers 17 are coupled directly to the motor vehicle body, in each case via the corresponding push rod 18. However, it is the case here and preferably that the driven levers 17 are each drive-wise coupled to the fixed part (still to be explained, that is to say fixed to the vehicle body) of the respective hinge 3, 4 via the corresponding push rod 18. It is possible as a result for the hatch 1 including the drive arrangement and the hinges 3, 4 to be preassembled.

FIG. 3 shows that the geometrical lever arm 19 of the drive lever 16 is larger than the geometrical lever arm 20 of the driven lever 17. “Geometrical lever arm” is to be understood in each case as the spacing between the two articulation points of the respective lever 16, 17. It follows from the illustration in FIG. 3 that the drive train part comprising redirection lever 12, 13, push rod 18 and hinge 6, 7 forms a gear, which gear ratio is substantially a function of the lever ratios firstly at the respective redirection lever 12, 13 and secondly at the respective hinge 3, 4.

The gear ratio of the above gear changes with the movement of the hatch 1 here and preferably. Here, it is preferably the case that the profile of the transmission ratio corresponds to the profile of the torque which is a result of the weight and acts on the hatch 1. This means, for example, that doubling of the torque as a result of weight accompanies doubling of the transmission ratio in a first approximation. Only small variations in the drive force which is to be applied by the drive 2 can therefore be realized during normal operation, which in turn has an advantageous effect on the design of the drive 2, in particular on the design of the drive motor of the drive.

It is the case in one particularly preferred embodiment that the transmission ratio of the above gear runs through a maximum during the movement of the hatch 1 from the closed position into the open position. Therefore, in many fields of application, a sufficient approximation to the above-described torque profile as a result of the weight can already be achieved.

It can be gathered from the illustration in FIG. 3 that the hinges 3, 4 in each case have a hatch-side hinge part 21 and an above-described stationary hinge part 22 on the vehicle-body side. Furthermore, it can be gathered from the illustration in FIG. 3 that the hinges 3, 4, in each case the hatch-side hinge part 21 here, are fastened from the outside to a wall of the cavity 8 which receives the drive 2. Here, one embodiment can also be advantageous, in which the hinges 3, 4 are fastened from the outside to the wall in each case via a coupling element (not shown), such as a bracket or the like.

Furthermore, it can be gathered from the illustration in FIG. 3 that corresponding carrier components 23 for the redirection levers 12, 13 are fastened from the inside to the above wall so as to lie opposite one another in each case. This ensures that, in the case of a suitable design, the force flow of the drive force which is applied by the drive 2 does not bring about twisting of the hatch 1.

Here and preferably, the hinges 3, 4, the respective hatch-side hinge parts 21 here, are screwed to the respective carrier components 23, including the above wall. In principle, the hatch-side hinge parts 21 and the optionally provided coupling elements and/or the carrier components 23 for fastening can also be overmoulded using the plastic moulding process, in particular, using the plastic injection moulding process, which leads to a particularly inexpensive arrangement.

In another preferred embodiment the hinges 3, 4 and the respective carrier elements 23 are in pairs designed as one single part. This leads to cost reduction due to the reduction of the number of parts and due to a simplified assembly.

The embodiment of the redirection gear 9 with redirection levers 12, 13 makes a simple realization possible of end stops for limiting the adjustment paths of the drive 2. An end stop of this type is preferably equipped with a shaped-out moulding on the respective redirection lever 12, 13 and a corresponding shaped-out moulding on the respective carrier component 23. However, it is also conceivable that, as an alternative or in addition, corresponding end stops are provided in the drive 2 itself, in particular in the spindle drive.

The drive 2 which is shown in FIG. 2 is equipped with a housing 24 which is mounted on the hatch 1 in a non-separated manner. The drive 2 is held in the cavity 8 solely via the drive connections 6, 7. In order for it not to be necessary to absorb vertical accelerations, for example when driving through potholes or the like, solely via the drive connections 6, 7, there is preferably provision for the drive 2 to be assigned a support perpendicular to its longitudinal extent. In principle, it is conceivable that this support is formed integrally onto the housing 24 of the drive 2. However, the support can also be a section of the hatch 1. Finally, it is conceivable that the cavity 8 of the hatch is filled, in particular foamed, partly with a material which supports the drive 2. Here, it is of course to be ensured that the adjustability of the drive 2 is guaranteed. In normal operation, the drive 2 is therefore preferably free of the support and does not come into engagement with the support until at high vertical accelerations.

The at least partial filling of the cavity 8 with defined materials, for example with a nonwoven or the like, can also be advantageous with regard to the resulting noise behaviour of the drive arrangement. For example, the cavity 8 which receives the drive 2 can be filled, in particular foamed, at least partially with correspondingly noise-deadening material.

Here and preferably, the drive 2 is configured as a spindle drive, the drive 2 comprising within the housing 24 subsequently arranged a drive motor with a subsequent intermediate gear and a spindle/spindle nut gear subsequent to the intermediate gear. With regard to details of the structural design of a spindle drive of this type, reference may be made again to German Utility Model DE 20 2005 007 154 U1 from one of the two applicants.

In one particularly preferred embodiment, the housing 24 of the spindle drive 2 comprises two basically tubular housing parts 24*a*, 24*b* which interact in a telescopic manner and are form fitted and thereby are pivot locked to each other. It is preferably the case that one housing part 24*a* has a first shaped-out moulding in cross section and the second housing part 24*b* has a complementary second shaped-out moulding in cross section. With a suitable design, the resulting form fit connection can lead to an increase in the rigidity of the drive 2, in particular with regard to the abovementioned vertical accelerations.

Here and preferably, the overall length of the spindle drive 2 in the extended position is a multiple of its maximum way of movement. In the exemplary embodiment which is shown and to this extent preferred, the overall length of the spindle drive 2 in its extended position is about four times of its maximum way of movement. In the case of an elongate embodiment of the spindle drive 2, in particular, the spindle drive 2 can be coupled to the two redirection levers 12, 13 without additional transmission elements being connected in between, which leads to a reduction in the number of components.

The drive 2 preferably comprises a control device for control of the drive movements, which control device is arranged in the cavity 8 of the hatch 1, which cavity 8 receives the drive 2. In addition, the control device is preferably arranged in the area of the hatch axis 5.

The arrangement of the control device which is assigned to the drive 2 in the cavity 8 has the advantage, in particular, that the control device together with the hatch 1 can otherwise be preassembled and can be connected electrically to the drive in the context of preassembly. Furthermore, it is advantageous here that only short lines are necessary for connecting the control device to the drive 2, which improves the behaviour of the arrangement with regard to EMC (electromagnetic compatibility).

The electrical connection of the control device to a higher-order controller and/or to the vehicle-mounted electrical system or the like can be guided through an opening in the hatch 1, which opening is preferably situated in the central region of the hatch 1 in the vicinity of the hatch axis 5 in relation to the longitudinal axis 5*a*.

It has already been noted that the solution according to the proposal can be applied advantageously to the tailgate 1 of a motor vehicle. Similar advantages can be achieved in the application of the solution according to the proposal, however, to a tailgate, an engine hood, a side door or the like of a motor vehicle. The invention may even be applied to a spoiler, as will be explained in detail.

It may be pointed out that there are numerous variants for constructing the redirection gear 9 of the drive arrangement that are corresponding to the invention.

One advantageous variant is the redirection gear 9 comprising a gear wheel, that is excentrically coupled to the drive 2 on the one hand and that is excentrically coupled to the motor vehicle body on the other hand. The excentricity here is to be seen relative to the gear wheel axis. In this variant the gear wheel function-wise corresponds to the redirection lever described above. Accordingly, the coupling between the gear wheel and the drive 2 and/or the coupling between the gear wheel and the motor vehicle body may in each case well be realized via a push rod.

Figure 8:
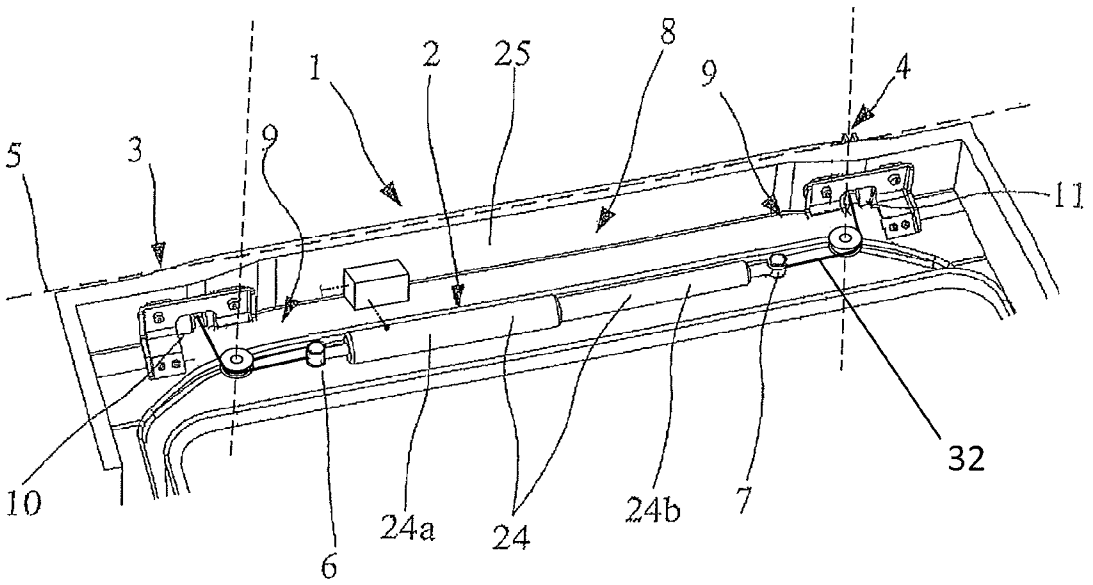
FIG. 8 shows a hatch with a dismantled hatch outer skin and a redirection gear that includes a flexible force transmission means.

Another advantageous variant is the redirection gear 9 comprising a flexible force transmission means 32 (shown in FIG. 8) that is coupled to the drive 2 on the one hand and that is coupled to the motor vehicle body on the other hand. Examples for such a flexible force transmission means may be a push-pull bowden cable, a ball chain, a chain drive or the like.

According to a further teaching which is likewise given independent significance, a hatch arrangement of a motor vehicle having a hatch 1 as above and a drive arrangement for actuation of the hatch 1 is claimed. With regard to advantageous refinements of the drive arrangement, reference may be made to the above embodiments which relate to the drive arrangement according to the proposal.

In one particularly preferred embodiment of the hatch arrangement, the cavity 8 which receives the drive 2 is designed as a dry area. It is the case here that the cavity 8 is sealed at any rate against the ingress of spray water. In this context, the openings 10, 11 in the hatch 1 which are assigned to the push rods 18 are sealed in each case via a folding bellows or the like with respect to the motor vehicle body. This ensures that the cavity 8 is protected against spray water in the above context both with a closed hatch 1 and also with an open hatch 1. In principle, it can also be advantageous that the above protection against spray water exists exclusively when the hatch 1 is closed. For example, a seal could be provided which is fixed on the vehicle-body side and comes into sealing engagement with the hatch 1 only when the hatch 1 is closed.

It can be gathered from the illustration in FIG. 2 that the hatch 1 comprises a hatch inner skin 25. Furthermore, a hatch outer skin 26 is provided which is connected to the hatch inner skin 25 and is merely indicated in the illustration in FIG. 1.

Here and preferably, the hatch inner skin 25 is formed in one piece and the hatch outer skin 26 is formed in multiple pieces. In principle, the hatch inner skin 25 can also be formed in multiple pieces.

It is essential then that the cavity 8 which receives the drive 2 is formed by the hatch inner skin 25 and the hatch outer skin 26. Here, it is preferably the case that the drive 2 is separated from the vehicle interior by the hatch inner skin 25. The crash security can therefore be reduced considerably with regard to a risk of injury which is possibly caused by the drive 2.

Furthermore, it is essential that a part of the hatch outer skin 26 forms a cover for the cavity 8 which receives the drive 2. The cover is of strip-shaped design and extends substantially over the entire width of the hatch 1. Here and preferably, the cover is a spoiler component 27.

The drive 2 can be serviced in a particularly comfortable way as a result of the fact that the cavity 8 is preferably assigned a cover which is screwed onto the hatch inner skin 25 in a more preferred embodiment. When the cover is removed, the drive 2 is accessible directly for maintenance work.

Furthermore, the fact that correspondingly different hatch variants can be produced by the exchange of covers of different design is advantageous in the realization of the above cover. It is conceivable, for example, that different spoiler components 27 can be screwed onto the hatch inner skin 25.

In particular with regard to the addressed crash security, it is advantageous if at least the hatch inner skin 25 is configured as a metal sheet. In the case of a corresponding design, it is also conceivable that the hatch inner skin 25 consists at least partially of a plastic material, such as, for example, a thermoplastic material or a thermosetting material. The configuration of the hatch 1 from integral foam or the like is also conceivable. Furthermore, it is then preferably the case that the hatch inner skin 25 comprises support structures and/or a carrier element at least in the region of the hatch axis 5. In each case for fastening, the support structures and/or the carrier element can be overmoulded in the hatch inner skin using the plastic moulding process, in particular using the plastic injection moulding process.

Reference may also be made to the fact that the drive 2 can be equipped advantageously with an integrated spring arrangement which counteracts the weight of the hatch 1. The application of a spindle drive 2 which is addressed above and is to this extent preferable can be a spring arrangement having a compression coil spring or the like which is arranged concentrically with respect to the spindle of the spindle/spindle nut gear. With regard to the configuration and the arrangement of a spring arrangement of this type, reference may be made to German Utility Model DE 20 2005 003 466 U1 which is attributed to one of the two applicants and which to this extent is made the subject matter of the present application.

If an above spring arrangement is provided, additional gas-filled compression dampers or the like can be dispensed with completely. In a case of this type, all the components which relate to the support of the hatch 1 are arranged in the cavity 8 which receives the drive 2. In particular, this makes a simple realization possible of an electronic, preferably sensor-based pinch protection means, since there is no longer a pinching risk as a result of gas-filled compression dampers or the like. For example, a sensor, in particular a capacitive sensor, can be used here which extends along the edge of the hatch 1 and, in view of the absent gas-filled compression dampers, can provide satisfactory monitoring security with regard to a pinching case. The use of other sensor variants is conceivable.

In principle, it is also conceivable that the drive 2 is assigned a separate spring arrangement. Here, it can again be a compression coil spring, or else a gas-pressure spring or the like. Here too, both the drive 2 and the separate spring arrangement are preferably arranged in the cavity 8 of the hatch 1.

In one preferred variant (not shown here), it is the case that a spoiler component 27 which is addressed above but is adjustable here is arranged on the hatch 1, which spoiler component 27 is drive-wise coupled to the drive 2 in such a way that the spoiler component 27 can be moved between a retracted and an extended position by means of the drive 2. This is to be considered correspondingly in the case of the drive-wise coupling between the drive 2 and the hatch 1 and between the drive 2 and the spoiler component 27.

The above dual use of the drive 2 of course leads to a compact and, above all, inexpensive arrangement.

It was mentioned further above that the drive-wise coupling between the drive 2 and the spoiler component 27 can be active only when the hatch 1 is situated in the closed position. Selective coupling of this type can be realized readily, as has likewise been explained further above.

The variants explained up to now for a redirection gear 9 are always equipped with two redirection levers 12, 13 and correspondingly two push rods 18, with the result that the drive force acts on both sides on the motor vehicle body in relation to the longitudinal axis of the motor vehicle. A low distortion of the hatch 1 to be adjusted can thus be ensured.

In certain applications, in particular in the case of particularly lightweight or spring-supported hatches 1, it can be sufficient, however, that the drive arrangement acts only on one side on the motor vehicle body. Correspondingly, the redirection gear 9 is then equipped with a single redirection lever 12 and correspondingly with a single push rod 18. The drive lever 16 of one redirection lever 12 is then coupled to the drive 2 which is coupled to the hatch 1 at its other force output point. An asymmetrical design of this type of the drive arrangement is particularly favourable with regard to the material and assembly costs.

It has already been noted that the drive arrangement according to the proposal for actuation of a hatch 1 can be used in principle for the actuation of an adjustable spoiler component 27. This is shown in one preferred embodiment in FIG. 4.

Figure 4:
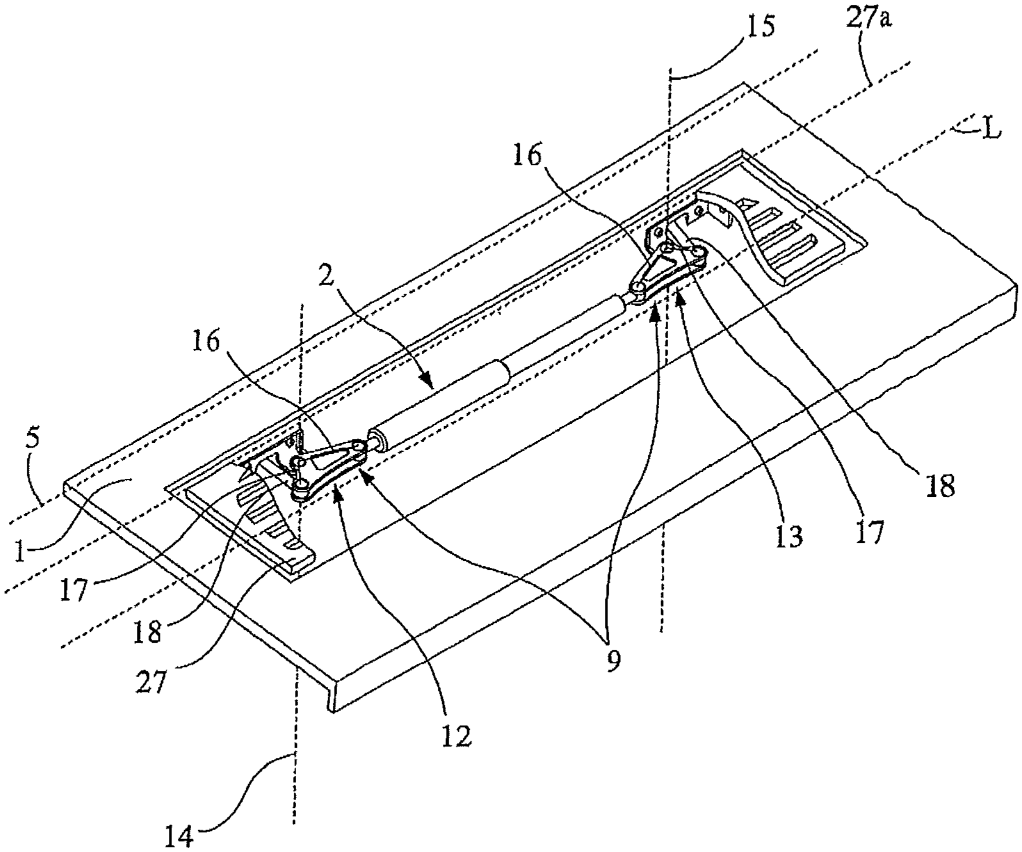
FIG. 4 shows a tailgate of a motor vehicle, which tailgate carries an adjustable spoiler component, in the dismantled state, in a perspective illustration.

The spoiler arrangement shown in FIG. 4 comprises an elongate spoiler component 27 which extends in FIG. 4 along the straight line provided with the reference sign "L". The spoiler component 27 is carried by a tailgate 1 and can be moved with respect to the tailgate 1, in particularly transversely with respect to its longitudinal extent L, between the retracted position shown and an extended position (not shown). Here and preferably, this adjustment takes place about the pivot axis 27*a*. However, all possible variants of movement types are conceivable in principle. In another preferred variant, the spoiler component 27 can also be carried by a stationary vehicle-body component.

A drive arrangement with a drive 2 is provided for actuating the spoiler component 27, which drive arrangement is of identical construction in the exemplary embodiment which is shown and to this extent preferred to the drive arrangement shown in FIGS. 1 to 3. To this extent, all the variants explained in conjunction with the drive arrangements shown in FIGS. 1 to 3 can be applied correspondingly to the drive arrangement for the spoiler component 27 and can be claimed.

It is essential according to the further teaching that the drive 2 is configured as an elongate linear drive, as a spindle drive here, for producing linear drive movements, and that the drive 2 extends along the spoiler component 27 and is aligned basically parallel to the spoiler component 27 in view of its linear drive movements. It has been noted further above that the installation space which is present in any case along the spoiler component 27 can be used in an optimum manner by way of an arrangement of this type.

In the exemplary embodiment which is shown and to this extent preferred, the drive 2 is arranged at or in the spoiler component 27 in the installed state. Correspondingly, the drive 2 for actuation of the spoiler component 27 is pushed away as it were on the hatch 1. If the spoiler component 27 is not arranged on the hatch 1 as here, but rather on a stationary motor-vehicle body component, the drive 2 is correspondingly pushed away on the vehicle-body component. This vehicle-body component can be, for example, the rear roof frame of the motor vehicle.

In principle, the drive 2 can also be arranged separately from the spoiler component 27, however, for example on the rear roof frame or on the tailgate 1 of the motor vehicle.

Precisely as in the drive arrangement shown in FIGS. 1 to 3, the drive arrangement shown in FIG. 4 is also assigned a redirection gear 9, the drive 2 being coupled here and preferably via the redirection gear 9 to the hatch 1 of the motor vehicle, which hatch 1 carries the spoiler component 27.

Depending on the arrangement of the drive 2, however, there can also be provision for the drive 2 to be drive-wise coupled to the vehicle body via the redirection gear 9. If the drive 2 is not arranged in or on the spoiler component 27, there is correspondingly provision for the drive 2 to be coupled to the spoiler component 27 via the redirection gear 9.

In detail, it is the case in the arrangement shown in FIG. 4 that the redirection gear 9 has two redirection levers 12, 13 which each are pivotable around a redirection axis 14, 15. Here and preferably, the redirection axes 14, 15 are each aligned basically perpendicular to the longitudinal extent of the drive 2 and, as an alternative or in addition, perpendicular to the longitudinal extent L of the spoiler component 27.

Again in accordance with the embodiment shown in FIGS. 1 to 3, the redirection levers 12, 13 are preferably configured drive-wise as two-arm levers. Correspondingly, the redirection levers 12, 13 each have a drive lever 16 which is assigned to the drive 2 and a driven lever 17 which is assigned here and preferably to the hatch 1.

In a consequent development of the drive concept shown in FIGS. 1 to 3, there is provision in the arrangement shown in FIG. 4 for the driven levers 17 to each be drive-wise coupled to the tailgate 1 via a push rod 18.

It may be noted that the drive arrangement for the adjustment of the spoiler component 27 does not also necessarily need to be of symmetrical construction. It is conceivable that the drive arrangement, as explained further above in conjunction with the arrangement shown in FIGS. 1 to 3, has only a single redirection gear 9, and that therefore the spoiler component 27 can be adjusted via a single push rod 18.

Finally it may be noted that numerous variations of the kinematics of the drive arrangement may be realized. In the following three variants will be explained for a hatch arrangement which may well be applied to a spoiler arrangement as well. Those variants differ from each other only in view of the position of the drive connection 6, of the push rod connection 18*a* (connection between push rod 18 and redirection levers 12, 13) and redirection axis 14.

Figure 5:
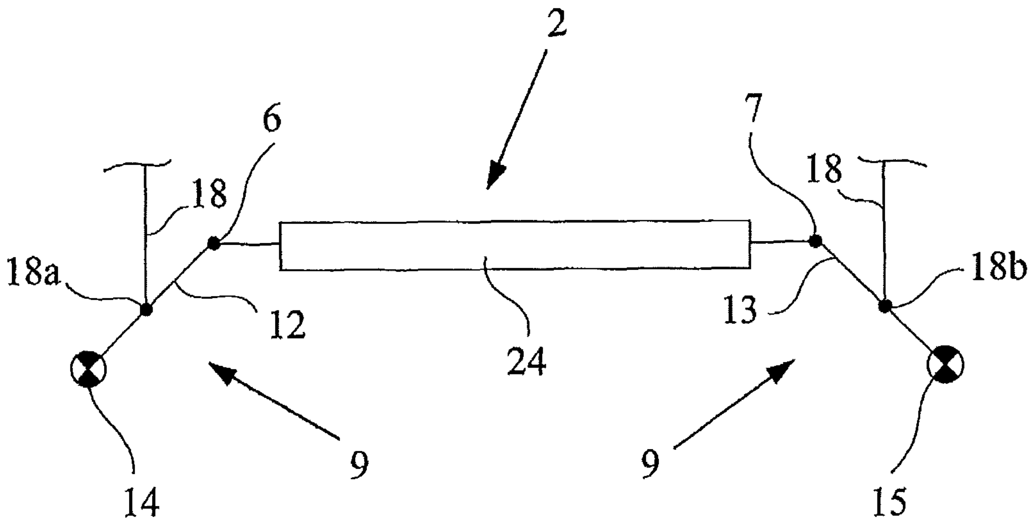
FIG. 5 shows a drive arrangement having push rod connections arranged between respective drive connections and redirection axes in which a pushing force may be transmitted via the push rods by extending the drive.
Figure 6:
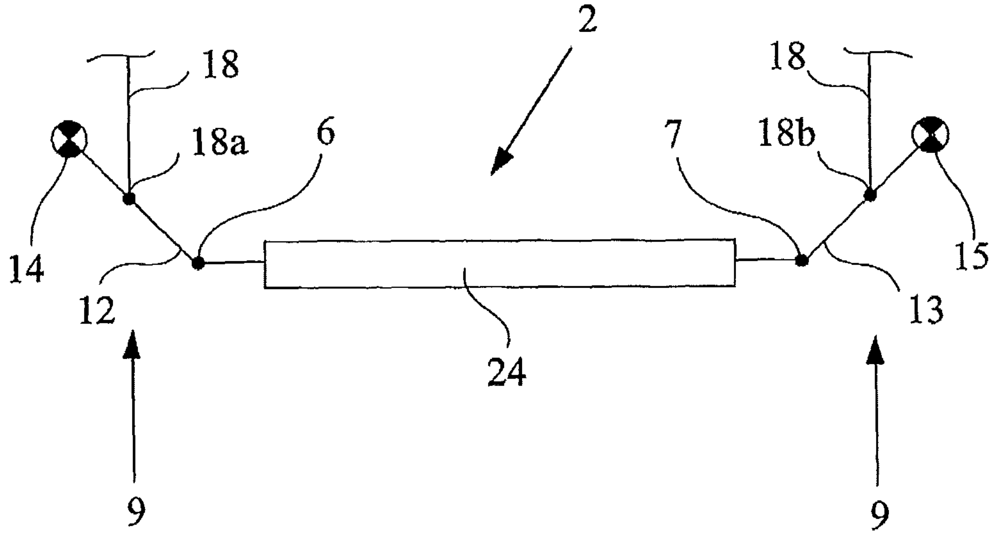
FIG. 6 shows a drive arrangement having push rod connections arranged between respective drive connections and redirection axes in which a pushing force may be transmitted via the push rods by retracting the drive.

FIGS. 5 and 6 show that each push rod connection 18*a*, 18*b* is arranged between the respective drive connection 6, 7 and redirection axis 14, 15. The expression "between" is to be understood in an extended sense such that when proceeding along a straight connection line between the drive connection 6, 7 and the respective redirection axis 14, 15 the respective push rod connection 18*a* is passed.

In the embodiment shown in FIG. 5 a pushing force may be transmitted via the push rods 18 by extending the drive 2. In the embodiment shown in FIG. 6, oppositely, such pushing force may only be produced by retracting drive 2.

Both embodiments shown in FIG. 5 and in FIG. 6 are advantageous in view of the installation room needed for the redirection gears 9.

Figure 7:
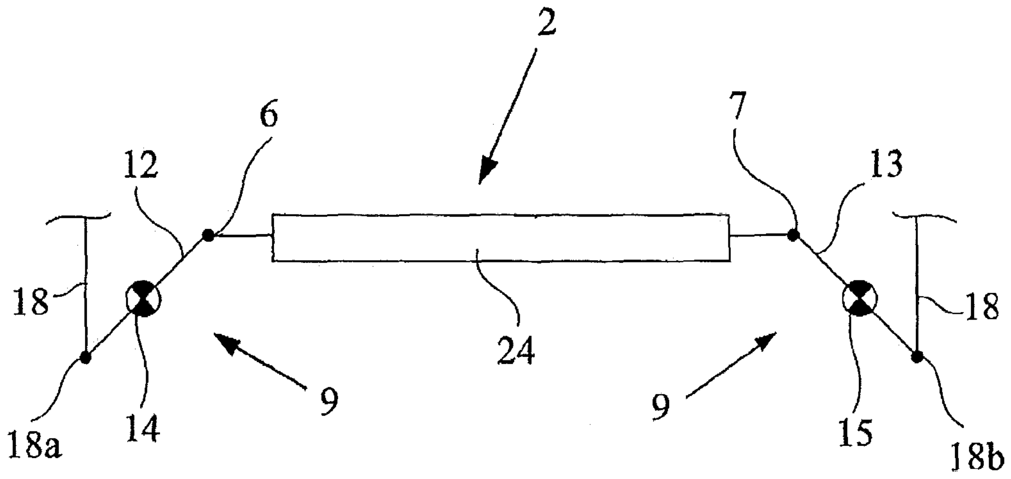
FIG. 7 shows a drive arrangement having redirection axes positioned between respective push rod connections and respective drive connections.

Another interesting embodiment is shown in FIG. 7. Here each redirection axis 14, 15 is positioned between the respective push rod connection 18*a*, 18*b* and the respective drive connection 6, 7. Again the transmission of pushing forces via the push rods 18 is done by retracting the drive 2.

As noted above various further modifications of the kinematics of the drive arrangement may well be applied.

What is claimed is:

1. A Drive Arrangement for actuation of a hatch of a motor vehicle, comprising an elongated linear drive for producing linear drive movement, wherein the hatch is pivotable via hinges around a geometrical hinge axis so that a hatch opening of a motor vehicle body may be closed wherein in an installed state the drive extends along or parallel to the hinge axis; and wherein in the installed state the drive is positioned in a cavity of the hatch in an area of the hinge axis so that the drive moves with the hatch as the hatch pivots about the geometrical hinge axis, a redirection gear is arranged in the area of the hinge axis and the drive is drive-wise coupled to the motor vehicle body via the redirection gear through openings in the hatch.

2. The Drive Arrangement according to claim 1, wherein the redirection gear comprises two redirection levers that each are pivotable around a redirection axis.

3. The Drive Arrangement according to claim 1, wherein the redirection levers are drive-wise designed as two-arm levers which each comprise a drive lever which is assigned to the drive and a driven lever which is assigned to the motor vehicle body.

4. The Drive Arrangement according to claim 3, wherein the driven levers each are coupled to the motor vehicle body via a push rod.

5. The Drive Arrangement according to claim 3, wherein the driven levers are each drive-wise coupled to the fixed part of the respective hinge via a push rod.

6. The Drive Arrangement according to claim 3, wherein a geometrical lever arm of the drive lever is larger than the geometrical lever arm of the driven lever of the respective redirection lever.

7. The Drive Arrangement according to claim 1, wherein a drive train part comprising the redirection lever, a push rod and a hinge forms a gear, which a gear ratio changes during movement of the hatch from the closed position to the opened position.

8. The Drive Arrangement according to claim 1, wherein the drive is configured as a spindle drive.

9. The Drive Arrangement according to claim 1, wherein the drive comprises a control device for control of the drive movements and the control device is arranged in the cavity of the hatch which receives the drive.

10. The Drive Arrangement according to claim 1, wherein the redirection gear comprises one single redirection lever which is pivotable around a redirection axis.

11. The Drive Arrangement according to claim 1, wherein the redirection gear comprises a gear wheel, that is excentrically coupled to the drive on the one hand and that is excentrically coupled to the motor vehicle body on the other hand.

12. The Drive Arrangement according to claim 1, wherein the redirection gear comprises a flexible force transmission means that is coupled to the drive on the one hand and is coupled to the motor vehicle body on the other hand.

13. A Hatch Arrangement of a motor vehicle with a hatch that is pivotable via hinges around a geometrical hinge axis so that a hatch opening of the motor vehicle body may be closed, the hatch arrangement comprising a drive arrangement with a drive for actuation of the hatch, wherein the drive is positioned in a cavity of the hatch in the area of the hinge axis so that the drive moves with the hatch as the hatch pivots about the geometrical hinge axis.

14. The Hatch Arrangement according to claim 13, wherein the drive is an elongate linear drive for producing linear drive movement and the drive extends along or parallel to the hinge axis.

15. The Hatch Arrangement according to claim 13, wherein in the area of the hinge axis a redirection gear is arranged and the drive is drive-wise coupled to the motor vehicle body via the redirection gear through openings in the hatch.

16. The Hatch Arrangement according to claim 13, wherein the cavity that receives the drive is designed as a dry area.

* * * * *